(12) United States Patent
Auberon et al.

(10) Patent No.: US 9,169,825 B2
(45) Date of Patent: Oct. 27, 2015

(54) DEVICE FOR ASSEMBLING SECTIONS OF WIND-TURBINE BLADES AND METHOD FOR LINKING SECTIONS OF WIND-TURBINE BLADES

(75) Inventors: Marcel Auberon, St Medard en Jalles (FR); Nicolas Petermann, Bordeaux (FR)

(73) Assignee: ASTRIUM SAS, Paris (FR)

( * ) Notice: Subject to any disclaimer, the term of this patent is extended or adjusted under 35 U.S.C. 154(b) by 903 days.

(21) Appl. No.: 13/384,161

(22) PCT Filed: Jul. 6, 2010

(86) PCT No.: PCT/EP2010/059657
§ 371 (c)(1),
(2), (4) Date: Feb. 16, 2012

(87) PCT Pub. No.: WO2011/006800
PCT Pub. Date: Jan. 20, 2011

(65) Prior Publication Data
US 2012/0141284 A1    Jun. 7, 2012

(30) Foreign Application Priority Data
Jul. 16, 2009 (FR) ...................................... 09 54935

(51) Int. Cl.
*F03D 1/06* (2006.01)

(52) U.S. Cl.
CPC ........... *F03D 1/0675* (2013.01); *F05B 2230/60* (2013.01); *F05B 2260/30* (2013.01); *F05B2280/6003* (2013.01); *F05C 2253/04* (2013.01); *Y02E 10/721* (2013.01); *Y10T 29/53978* (2015.01)

(58) Field of Classification Search
CPC ..... F03D 1/0675; F03D 1/001; F03D 1/0683; Y02E 10/721
See application file for complete search history.

(56) References Cited

U.S. PATENT DOCUMENTS 5,288,109 A * 2/1994 Auberon et al. ............ 285/222.4
6,655,633 B1 * 12/2003 Chapman, Jr. ............. 244/123.9
(Continued)

FOREIGN PATENT DOCUMENTS

| EP | 0511138 A1 | 10/1992 |
| EP | 1184566 A1 | 3/2002 |
| EP | 1584817 A1 | 10/2005 |
| EP | 1878915 A2 | 1/2008 |

(Continued)

OTHER PUBLICATIONS

International Search Report Dated Oct. 22, 2010.

*Primary Examiner* — Nathaniel Wiehe
*Assistant Examiner* — Jeffrey A Brownson
(74) *Attorney, Agent, or Firm* — Perman & Green, LLP (57) ABSTRACT

A device for assembling sections of wind-turbine blades provided with casings, including at least one tie including a first portion and a second portion, the first portion being a portion for assembly with a casing of a first section and the second portion being a portion for mounting with a complementary tie supported by a casing of a second section, wherein the first portion includes at least one composite/metal shear link provided with a continuous fitting element on at least one surface of the casing which receives one end of the aformentioned surface of the casing, provided with attachment pins passing through the fitting and the end of the surface. According to a preferred embodiment, the composite/metal link has at least double shear and is additionally provided with a back-fitting element, the end of the aformentioned surface of the casing being received between the fitting and the back fitting, the attachment pins passing through the fitting, the end of the surface and the back fitting, the link also being provided with a means for attaching the back fitting to the fitting.

16 Claims, 5 Drawing Sheets

(56) References Cited

U.S. PATENT DOCUMENTS 7,481,624 B2  1/2009  Wobben
2009/0116962 A1 * 5/2009 Pedersen et al. ............. 416/31

FOREIGN PATENT DOCUMENTS

FR  2675563 A1  10/1992
WO  0148378 A1  7/2001

* cited by examiner

DEVICE FOR ASSEMBLING SECTIONS OF WIND-TURBINE BLADES AND METHOD FOR LINKING SECTIONS OF WIND-TURBINE BLADES

CROSS-REFERENCE TO RELATED APPLICATIONS

This application is the National Stage of International Application No. PCT/EP/2010/059657 International Filing date, 6 Jul. 2010, which designated the United States of America, and which International Application was published under PCT Article 21 (s) as WO Publication No. WO2011/006800 A1 and which claims priority from, and benefit of, French Application No. 0954935 filed on 16 Jul. 2009, the disclosures of which are incorporated herein by reference in their entireties.

The disclosed embodiments relate to the technology of mechanical links for structural parts made from composite materials and in particular provided in a device for assembling sections of wind turbine blades and the method for linking the associated sections of wind turbine blades.

The disclosed embodiments in particular relate to the field of large-scale wind turbine blades.

BACKGROUND

The mechanical links, unlike for example with bonded or welded links, are links that can be disconnected.

One method generally used to produce mechanical links between panels or structures made from composite materials involves using several metallic interface parts, each attached to the composite material in a discontinuous manner and using mechanical attachment means such as screws, pins, bolts or others.

Although these solutions appear optimised, this is actually not the case, as they do not provide for the homogenous passage of forces over the entire wall of the composite structure.

This generates local overflows creating the risk of a progressive breakage appearing on the zones subjected to higher stresses known as the peel-off phenomenon.

Furthermore, with regard to mechanical analysis, these local overflows are difficult to quantify, which is detrimental to the reliability and optimisation of the structure, with the link produced therefore being difficult to guarantee.

Today, wind turbines are designed with blades measuring several tens of meters in length. Such blades clearly create many technical problems in addition to logistics problems. The transportation of such structures, and more particularly over land, is not easy.

Wind turbine blades are made from composite materials, which enable these moving parts to keep a reduced weight, which in turn reduces the attachment forces to be transferred.

These blades are generally made from several sections so as to simplify their transport and in particular their transport by lorry.

A problem therefore arises involving the mechanical assembly of composite parts within the perspective of a mechanically optimised solution in terms of mass, in particular in the event where the forces to be passed by the link are significant and complex, the link being required to resist significant mechanical, fatigue and environmental stresses with very high reliability.

Documents EP 1 584 817, EP 1 878 915 and WO 01/48378 describe links for sections of wind turbine blades made by several metallic parts.

With regard to document EP 1 878 915, the link uses metallic rods inserted into the walls of the central casing and bonded in place.

In document WO 01/48378, the links are distributed along the skin of the blade and in document EP 1 584 817, separate ties connected to the central casing of the sections are attached together and supported by elements covering the gap between the blades.

These examples of embodiment use discontinuous mechanical attachment means.

Furthermore, known methods exist for the calculation of metal/composite pinned links, even if such a calculation is fairly complex due to the number of phenomena that must be taken into account and in particular: the transfer of forces between the composite material and the pins, the shear within the pins, the peening of the composite material, the tensile strength of the composite material and/or of the metal, and the scribing axis.

It should be noted that the known methods for calculating force transfers are very approximate, as they simplify the assembly geometry by representing the latter in the form of a single shear which enables the use of the shear calculation method known as the Huth method.

Due to this approximation, classic methods do not allow for the exhaustive parameterisation of the links.

In particular, the Huth model does not allow for geometrically non-symmetrical links to be studied, which limits its field of use.

Moreover, the calculation formulae associated with this model, in particular for calculating shear within pins, brings about generalisation difficulties for multi-shear, with this model not at all being adapted to suit the latter.

Document FR 2 675 563 describes a method for linking a tube made from composite material with a tubular metallic part.

In this method, the metallic part is attached to the composite material both by bonding and by mechanical attachments, which results in the possibility of passing very high mechanical flows. This method, for which optimisation of the pin link depends on the orientation of the winding wires, is however specific to wound tubes and therefore to a specific method of manufacturing the composite material.

This concept does not directly apply to composite parts such as sections of wind turbine blades, which are not generally manufactured by winding, and therefore the fibre orientation of which is set by the conditions for use of these blades.

SUMMARY

The purpose of the disclosed embodiments is therefore to define a mechanical link for structural parts and in particular a metal composite link being reliable and optimised both mechanically and in terms of mass, in particular for use on sections of wind turbine blades.

The link obtained must in particular be capable of being disconnected, minimise local overflows that the composite material may experience, be mechanically optimised and be compatible with the aerodynamic requirements of a wind turbine blade.

In order to achieve this, the disclosed embodiments relate to a device for assembling sections of wind turbine blades provided with casings, including at least one tie comprising a first portion and a second portion, the first portion being a portion for assembly with a casing of a first section and the second portion being a portion for mounting with a complementary tie supported by a casing of a second section, characterised in that the first portion includes at least one composite/metal shear link provided with a continuous fitting element on at least one surface of the casing which receives one end of said surface of the casing, provided with attachment pins passing through the fitting and the end of the surface.

According to a preferred embodiment, the composite/metal link has at least double shear and is additionally provided with a back-fitting element, the end of said surface of the casing being received between the fitting and the back fitting, the attachment pins passing through the fitting, the end of the surface and the back fitting, the link also being provided with a means for attaching the back fitting to the fitting.

According to a particular embodiment, the composite/metal link is a multi-shear link perpendicular to the attachments and integrates into the composite material by means of a metallic doubler adapted to carry forces between the composite portion and the metallic fitting.

The disclosed embodiments also relate to a wind turbine blade comprising at least two sections, each provided with a casing characterised in that the sections are assembled by means of an assembly device according to the disclosed embodiments.

Advantageously, the end of said surface terminates with a reinforced monolithic structure.

Preferably, the reinforced monolithic structure is essentially reinforced by carbon layers.

Advantageously, said central casing comprises a composite structure progressively replaced by the monolithic structure at the terminal point of the section.

According to one advantageous embodiment, said composite/metal link comprises a local reinforcing element for the end of the casing surface in the form of composite plies.

According to one particular embodiment of the disclosed embodiments, the fitting element is comprised from a continuous, closed frame supporting the surfaces and fins of the end of the casing.

Alternatively, the blade comprises two of said ties, the assembly portions of which are constituted from a plate supporting one surface of the end of the casing.

According to this alternative, said ties are advantageously positioned on the upper and lower surfaces of the casings located underneath the upper and lower surfaces of the section of the blade.

In this case, the ends of the casing surfaces located between the upper and lower surfaces preferably receive connecting squares.

The blade of the disclosed embodiments is advantageous, as the ends of the casing surfaces comprise a terminal point with a skin to skin terminal.

The ends of the casing surfaces can also comprise a terminal point with reinforcement of the skin to skin terminal.

According to an alternative embodiment, the ends of the casing surfaces comprise a terminal point with the filling of a honeycomb and/or a densified honeycomb.

According to a preferred embodiment of the blade, the portions for mounting the ties with the complementary ties comprise surfaces adapted for attachment by axial link to the tensile bolt means.

Advantageously, the ties are positioned within the aerodynamic profile of the blade.

BRIEF DESCRIPTION OF THE DRAWINGS

Other characteristics and advantages of the disclosed embodiments shall become apparent upon reading the following description given of a non-limitative example of embodiment provided with reference to the figures which represent.

DETAILED DESCRIPTION

Figure 1:
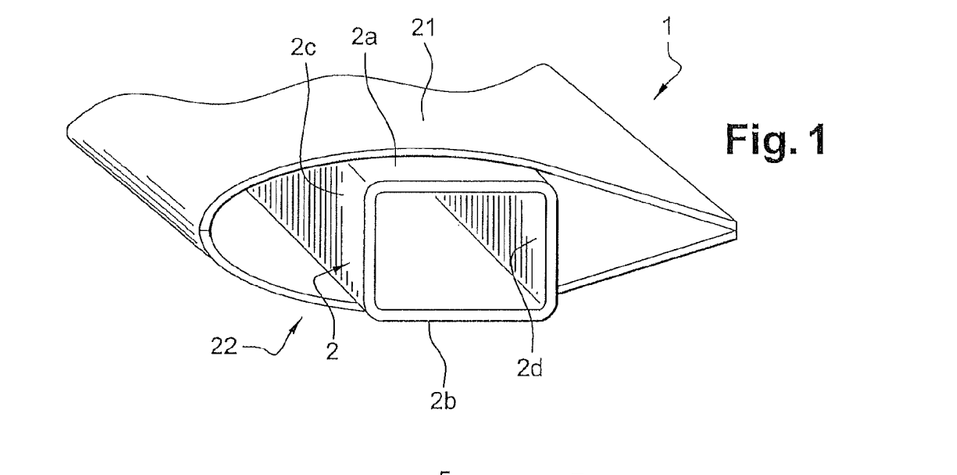
in FIG. 1: a schematic perspective view of a segment of a section of wind turbine blade.

The assembly device of disclosed embodiments is for example intended for wind turbine blades, one example of a section 1 of which is shown in FIG. 1.

This section comprises a skin forming the upper surface 21 and lower surface 22 of the blade and comprises a central casing 2 assuring the mechanical hold of the blade.

Several types of constructions exist, and known constructions involve an integral casing comprising a beam integrating spar reinforcements and on which is draped the profile of the blade in addition to constructions with a casing formed from spar reinforcements integrated into the skin creating a profile of the blade and associated webs or cross-rails.

The device of the disclosed embodiments can apply to both types of constructions.

Figure 3:
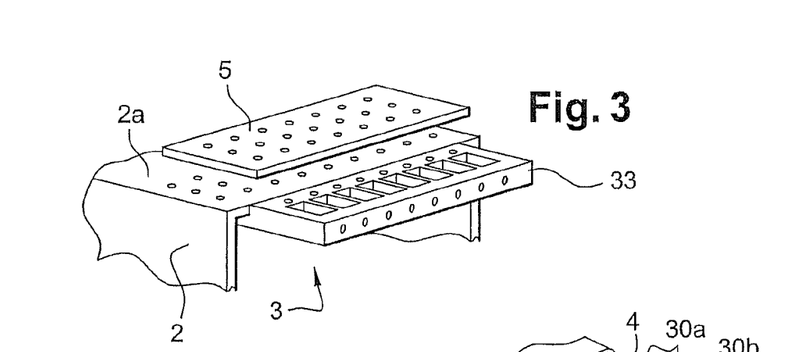
in FIG. 3: a schematic perspective view of the device in FIG. 2.
Figure 4:
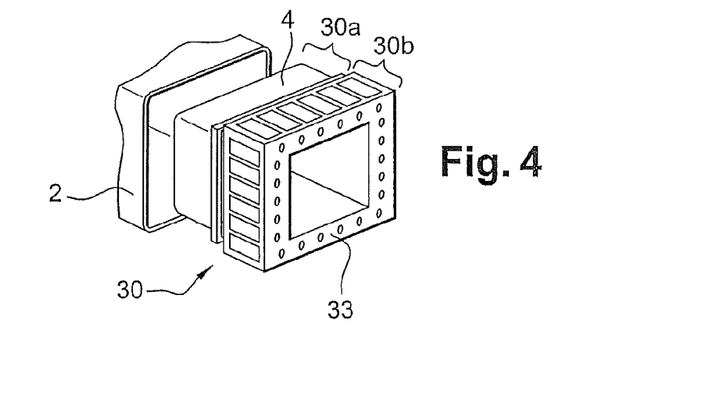
in FIG. 4: a perspective view of a second embodiment of the device of the disclosed embodiments.

It comprises at least one tie, a first embodiment of which is represented in FIG. 3 in the form of a flat tie 3 and a second embodiment of which is represented in FIG. 4 in the form of a frame-shaped tie.

Figure 2:
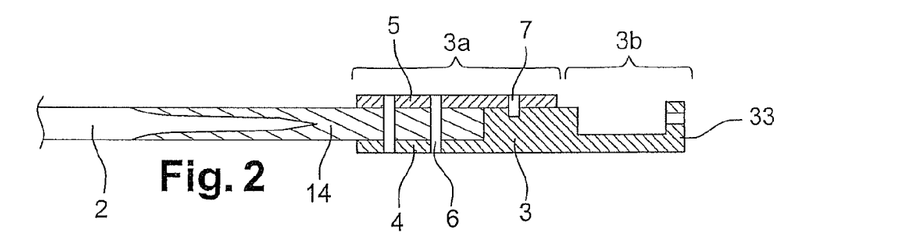
in FIG. 2: a schematic cross-section of a first embodiment of a device according to the disclosed embodiments attached to an element of a section of wind turbine blade.

A cross-section of the tie 3 is shown in FIG. 2. This tie comprises a first portion 3a for assembly with the casing 2 and the second portion 3b for mounting with a complementary tie supported by a casing of a second section.

The first portion 3a comprises at least one composite/metal link.

According to FIG. 2, this link is a double shear link provided with a continuous fitting element 4 on at least one surface 2a of the casing 2, is provided with a back-fitting element 5, between which an end of said casing surface is received, is fitted with attachment pins 6 passing through the fitting, the end of the surface and the back-fitting element and is provided with means 7 for attaching the back-fitting element to the fitting.

The term attachment pin groups together various types of attachments such as screws, pins, rivets or other through-hole mounting means.

According to the disclosed embodiments, the metal composite links are comprised from a fitting and a back-fitting element or doubler for assembly by mechanical double shear perpendicular to the link attachments, which is a more effective solution than a link assembled by single share with a one-sided fitting.

The metal composite link is optimised based on calculation elements, the principle of which is described hereinafter.

This optimisation defines the distribution and shape of the metal splice bar, the fitting and the doubler, the geometry, diameter and nature, the material, the attachments on each row and the optimal pitch per row and between link rows.

Figure 7:
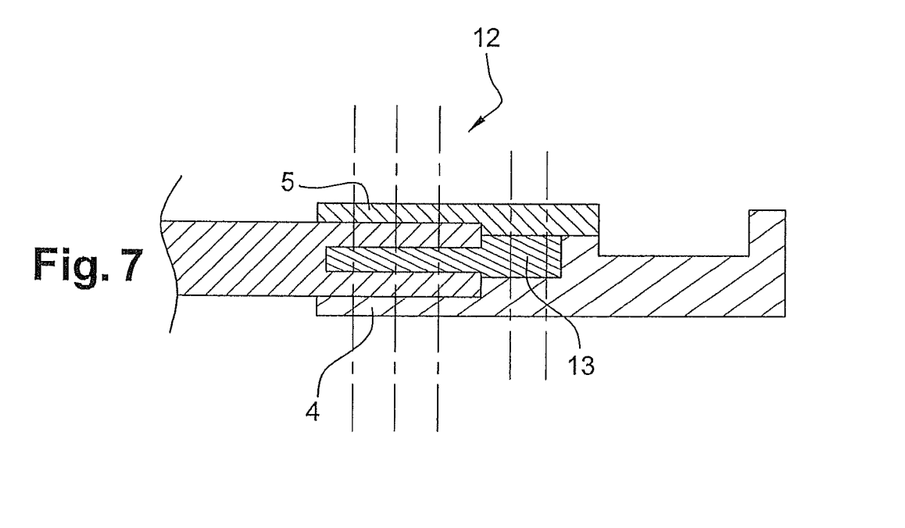
in FIG. 7: an alternative embodiment of the attachment in FIG. 2.

In the example provided in FIG. 7, the composite/metal link is a multi-shear link 12 perpendicular to the attachments and integrates into the composite material by means of a metallic doubler 13 in addition to the back fitting element 5, adapted to carry forces between the composite portion and the metallic fitting.

One multi-shear assembly solution perpendicular to the attachments by integrating metallic doublers into the composite material enables the number of doublers to be adapted according to the distribution of the shear desired on the attachments.

Indeed, the more doublers present, the higher the force transmitted by the attachment in order to pass the forces between the composite portion and the metallic fitting.

This limits the diameter of the bolts and provides an improved contribution from the composite structure.

In order to attach the back-fitting element to the fitting element, several solutions can be considered involving tie means such as those represented in FIGS. 6A to 6D.

Figure 6A:
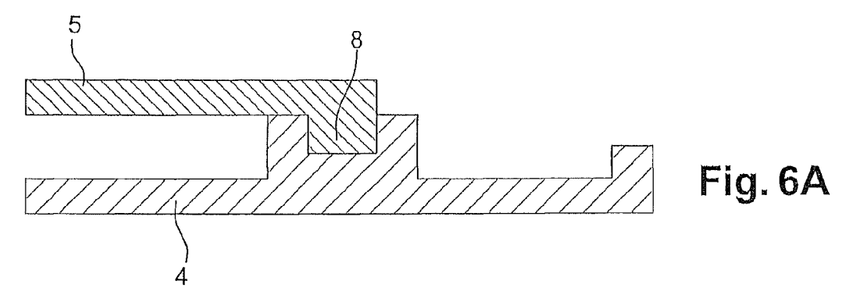
in FIGS. 6A to 6D: side view cross-sections of alternative embodiments of the device in FIG. 2.

FIG. 6A corresponds to a system for which an insert 8 is made between the back-fitting element and the fitting to hold the back-fitting element.

Figure 6B:
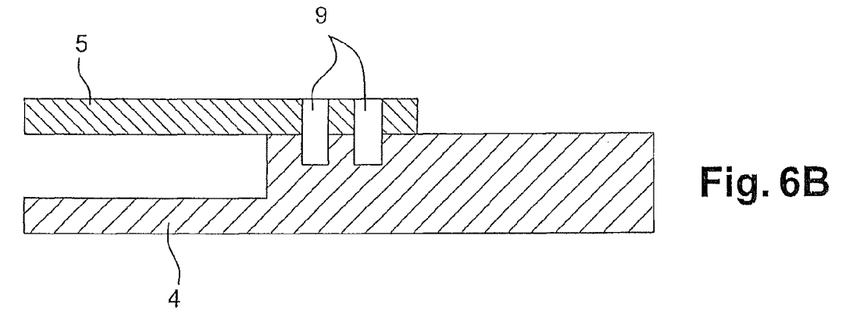

FIG. 6B corresponds to a system for which pins or screws 9 attach the back-fitting element to the fitting.

Figure 6C:
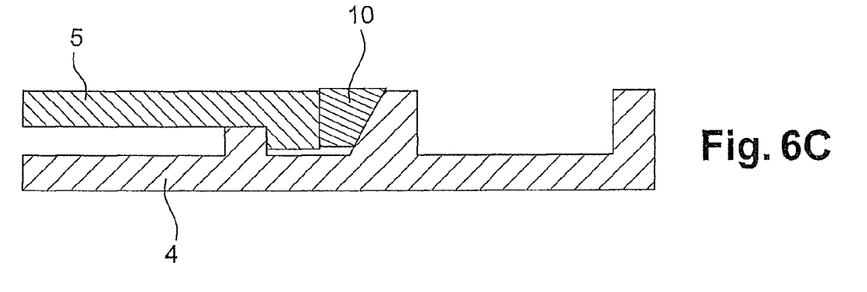

FIG. 6C corresponds to a system for which a wedge 10 locks the back-fitting element to the fitting.

Figure 6D:
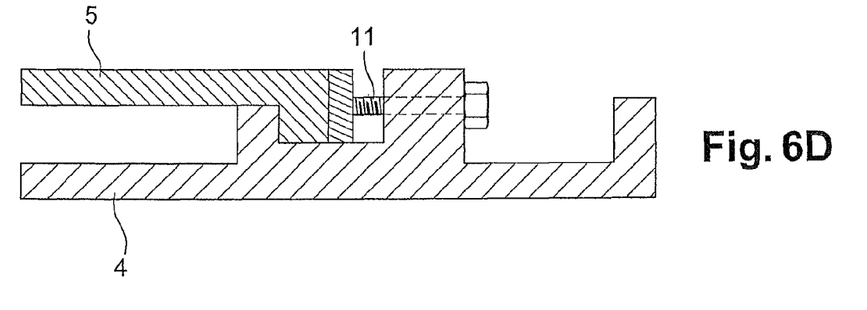

FIG. 6D corresponds to a system for which a screw device 10 locks the back-fitting element to the fitting.

The disclosed embodiments relate to a wind turbine blade or other spar comprising at least two sections (1), each provided with a casing (2) characterised in that the sections are assembled by means of a pair of assembly devices according to claim 1 or 2.

The wind turbine blades are today designed with a central structural beam in the form of a box known as a spar in English terminology, which transfers all forces, and with an aerodynamic skin.

In this case, the link must be created at this box beam.

Within the scope of the disclosed embodiments, the end of the casing receiving the composite/metal link has also been worked.

According to a first method represented in FIG. 2, the end of the surface 2a of the casing receiving the fitting terminates with a reinforced monolithic structure 14 and the composite structure is progressively replaced by the reinforced monolithic structure at the level of the section terminal point.

This reinforced monolithic structure 14 is essentially reinforced by carbon layers.

According to FIGS. 8A to 8D and FIG. 9, the composite/metal link comprises a local reinforcing element reinforcing the end of the casing surface in the form of composite plies 15 positioned on the plies of the skin 23.

According to these examples, a local reinforcing element reinforcing the composite part is made in the linking zone by polymerised composite plies.

Figure 9:
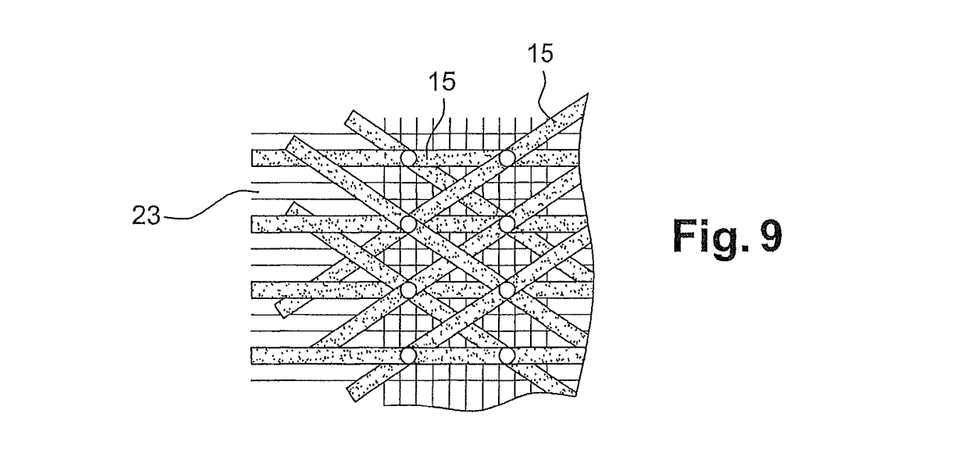
in FIG. 9: an overhead view of the reinforcing elements in the form of composite plies.

As represented in FIG. 9, the reinforcing layers of the wall are oriented and positioned so that the mechanical link is optimal according to the force transfer per attachment row and the maximum net bearing strength and tensile strength of the composite and metallic material.

This orientation of the reinforced plies takes into account the layout of the attachments in rows.

Figure 8A:
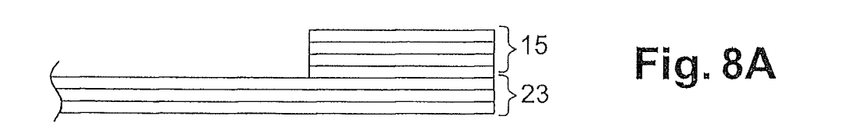
in FIGS. 8A to 8D: side view cross-sections of detailed examples of embodiment of reinforcing elements for the end of the elements of the sections of blades.

The reinforced plies can be positioned in several different ways:

According to FIG. 8A, the plies are positioned on top of each other with the reinforcing element being located in a completely external position. The current portion/reinforcing element force transfer is not optimal and a brutal change in stiffness exists. Overstressing at the edge can result in delamination.

Figure 8B:
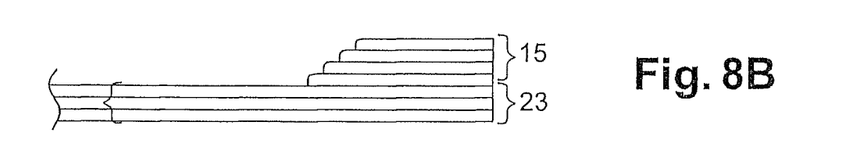

According to FIG. 8B, the plies are staggered along a slope. The reinforcing element remains external and the current portion/reinforcing element force transfer is not optimal.

Delamination of the first reinforcing element remains a major problem and no transmission occurs within the reinforcing element.

Figure 8C:
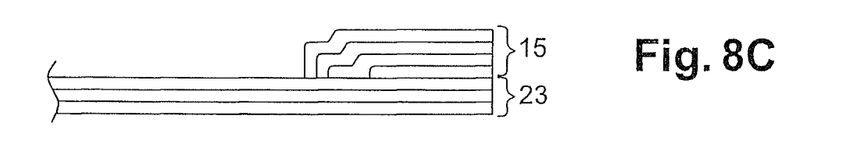

According to FIG. 8C, the plies are stacked and each ply returns to the surface of the casing.

The force transfer is correct, the reinforcing element is located in an external position and the current portion/reinforcing element force transfer is not optimal.

According to this example, the layer by layer transfer process is improved and the passage of forces is optimised on each layer.

This solution enables forces to be transferred even in the event of delamination on one layer.

Figure 8D:
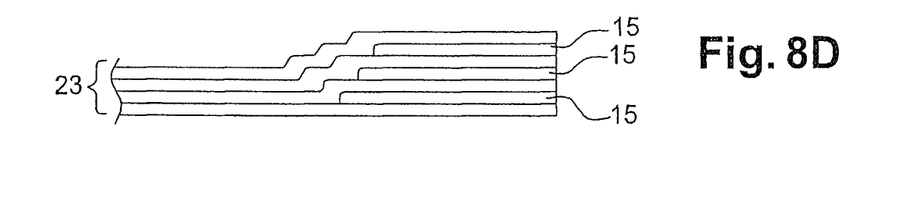

FIG. 8D, for which the reinforced plies and the spar plies are overlapped, corresponds to an optimal solution in which the transfer occurs by multi-shear.

This solution is transfer optimised and is capable of performing the transfer of forces despite delamination on one or several layers.

Returning to the example provided in FIG. 3, the fittings are continuous fittings and are adapted to each side of the stress-bearing wall of the casing of the section of blade and in particular on the two walls bearing the most mechanical stress: i.e. walls 2a, 2b on the side of the skin 21, 22.

In this case, the internal surfaces 2c, 2d, only playing a minor role in transferring forces, can only be linked by square devices such as those represented in FIGS. 10A to 11B.

In the example provided in FIG. 4, the device is produced in the form of a continuous internal frame adjusting on the 4 surfaces of the blade beam, the fitting element thus being constituted from a continuous, closed frame 30 supporting the fins of the end of the casing 2.

Figure 5:
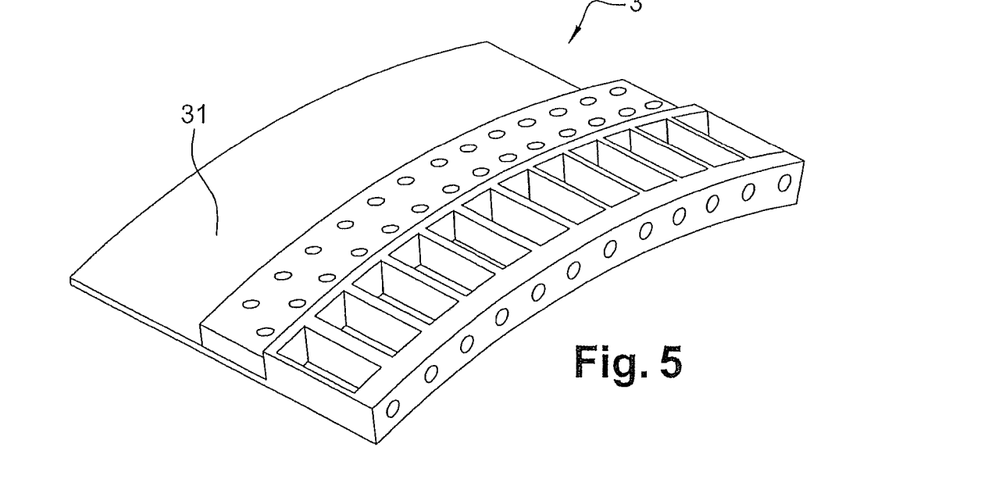
in FIG. 5: a perspective view of an alternative embodiment of the device in FIG. 2.

In the case shown in FIG. 5, as an alternative to FIG. 3, the assembly portions are constituted from a plate 31 supporting a surface of the end of the casing.

This profile is adapted to a convex casing with the device comprising two of said ties 3.

In this case, the ties are positioned on the upper 2a and lower 2b surfaces of the casings located underneath the upper 21 and lower 22 surfaces of the section of the blade.

Figure 10A:
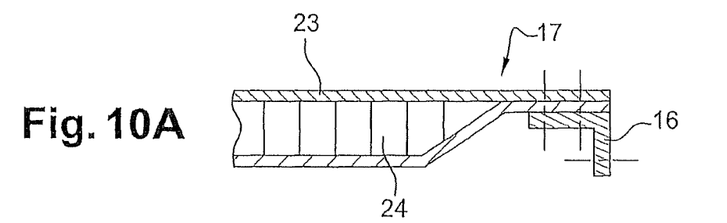
in FIGS. 10A to 10C: cross-sections of the complementary attachments of the device of the disclosed embodiments.
Figure 10B:
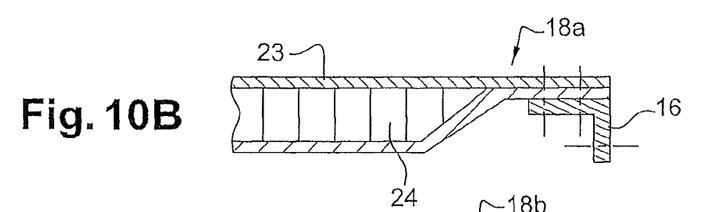
Figure 10C:
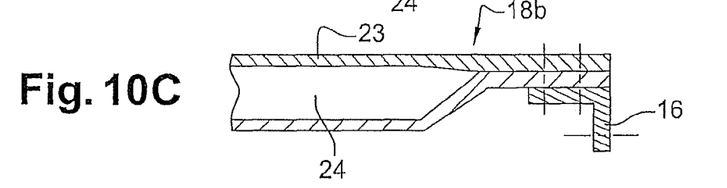

In the case where the ends of the surfaces 2c, 2d of the casing, located between the upper surfaces and the lower surfaces, receive connecting squares 16, the ends of the casing surfaces comprise a terminal point with a skin to skin terminal 17, 18a, 18b as represented in FIGS. 10A to 10C.

In such a configuration, the skins 23 covering the web 24 join together at the end of the casing.

According to FIG. 10A, the skin to skin terminal 17 is produced in the direction of the internal side of the wall opposite the side receiving the square 16.

Furthermore, the ends of the casing surfaces can also comprise a terminal point with reinforcement of the skin to skin terminal.

According to FIG. 10B, the skin to skin terminal 18*a* is produced in the direction of the internal side of the wall opposite the side receiving the square 16 and a reinforcement of the internal-sided skin is performed.

According to FIG. 10C, the skin to skin terminal 18*b* is produced in the direction of the internal side of the wall opposite the side receiving the square 16 and reinforcements of the internal-sided skin are performed.

Figure 11A:
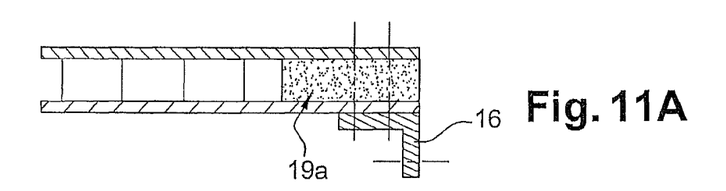
in FIGS. 11A and 11B: cross-sections of attachments alternative to those in FIGS. 10A to 10C.
Figure 11B:
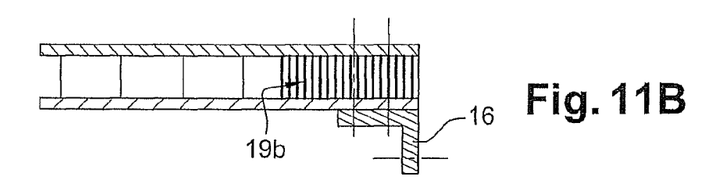

Alternatively, the ends of the casings receiving the squares comprise a terminal point with the filling of a honeycomb 19*a* as represented in FIG. 11A. In FIG. 11B, the ends of the casings are comprised from a densified honeycomb 19*b*.

Figure 12:
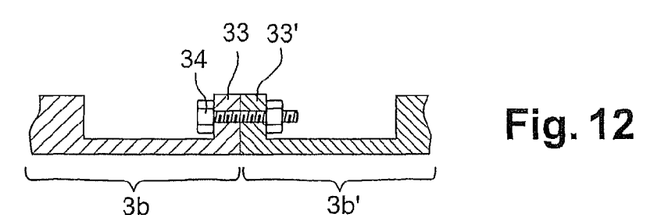
in FIG. 12: a detailed view of the device for attaching two sections of wind turbine blades according to the disclosed embodiments.

On the side of the link between the ties, the portions 3*b* for mounting the ties with the complementary ties comprise, as represented in FIG. 12, surfaces 33 adapted for attachment by axial link to the tensile bolt means 34.

Numerous devices are known to achieve this, however within the scope of the disclosed embodiments, an axial attachment is preferred, which enables a continuous link to be produced, thus limiting the flow irregularities and thus creating a link in the continuity of the profile and helping to obtain of the link's aerodynamic profile.

The assembly of the metallic fittings using attachment means such as bolts acts to transfer forces by shear within the attachments and by peening within the metallic and composite parts.

These ties 3, 30 are positioned within the aerodynamic profile of the blade.

The solution of the disclosed embodiments applies to a blade segmented into two portions, the length of the blade being 60 m, the weight being 18 Tonnes and the construction being built from composite fibres and a central casing structure.

The blade is classically comprised of two aerodynamic skins produced separately by vacuum infusion and made from fibre glass and/or carbon associated with an epoxy resin.

According to a first version, a spar manufactured separately, either as a single unit or by bonding two hat sections, is brought into the blade-shaped mould.

This spar acts to provide the longitudinal rigidity of the blade.

It is also manufactured by fibre glass and epoxy resin infusion, however can contain a proportion of carbon fibre for lightening purposes.

The two skins and the spar are then assembled by structural bonding at the leading edge, the trailing edge and the spar.

According to a second version, the central portion of the wall of the blade shall, in this solution, be a sandwich structure (foam or honeycomb web for maximum local inertia) reinforced in this area mainly by the use of carbon reinforcing elements.

As previously described, this portion of the blade structure plays the role of a spar and provides longitudinal rigidity and transfers all axial forces along the structure.

The inner walls are thus aligned by bonding during the bringing together of the two skins.

In this particular case, the local monolithic reinforcing element 14 is required at the composite/metal link as represented in FIG. 2.

The sandwich wall of the spar of the half-blade is progressively replaced in its link end zone by the monolithic structure, mainly reinforced by carbon layers so as to assure the transfer of the bearing and tensile/compressive forces of the attachments (bolts or pins) of the fitting and of the metallic doubler.

The fitting and the doubler are single unit parts taking on the shape of the side stress-bearing wall of the spar.

The fitting that creates the inter-segment link between the 2 half-blades is a concept known as de "cadre à chapelle", which produces an axial link where bolts operate under traction. For memory, a link by radial bolts can be considered with the prior installation of captive screws on the inner part of the fitting.

The dimensioning method for such a composite/metal link is applied within the scope of a detailed definition as follows:
  the transfer of forces between the composite and metallic elements is performed by bolt attachments positioned over 2 to 4 rows, with all bolts having the same diameter; indeed, for industrial reasons, it is simpler to manage only a minimum number of bolt families.
  the thickness of the composite material is maintained constant in order to simplify the manufacturing process;
  however, the wings of the fitting and of the doubler are progressive in thickness so as to evenly distribute the forces over each row according to the multi-shear calculation method;
  the metallic doubler is linked to the fitting by attachments which transfer the forces by single shear.

For the mechanical optimisation of the multi-shear link, instead of in theory converting the system into an equivalent system to which the Huth method can be applied in a general manner, the system is broken down into sub-assemblies to which the Huth method is rigorously applied.

In practice, the method consists in describing each shear by its stiffness, then in applying classic, simple mechanical relations. Finally, a system of equations is drawn up adapted to a resolution on a computer.

Therefore, all the specific properties of each shear (material, module, thickness) are taken into account and therefore each state of stress at a point is precisely calculated.

This enables each zone to be dimensioned as best as possible by an iterative process (when a too high stress level is found at an iteration, material is added, or, on the other hand, if the stress level is too low, material can be removed).

In order to achieve this, the real system is broken down into as many Huth systems as there are single-shear interfaces.

For illustration purposes, for the case of a shear link of 4 (2 composite wings and 3 metal wings) and constituted from 3 rows of pins, a set of 8 "mesh" Huth sub-systems is obtained. These sub-assemblies are represented by sets of 4 springs, each spring representing the stiffness of the material under stress.

According to the method, two adjacent meshes are connected by a "spring", which translates the fact that the same material is stressed by two distinct areas of shear: this is what the former Huth model could not do.

In order to dimension the links, the various stiffnesses must be calculated according to the properties of the materials concerned, the geometry of the parts involved and the forces to be passed in the link.

One particular application involves a wind turbine blade for which a double-shear link is used such as that described in reference to FIG. 3 for a casing with straight flanks, or in reference to FIG. 5 for curved casings.

For such a blade, the attachment of doublers is performed according to the example described hereinabove with reference to FIG. 6B, the link uses continuous "chapelles" and reinforcing elements for the composite portions according to the example described with reference to FIG. 8C or 8D respectively, reinforcing layers 15 positioned with a covering and a skin to skin terminal 23 for each of the layers or reinforced layers 15 overlapped between the layers 23 of the spars.

Finally, in keeping with this particular case, simple squares, in particular such as those in the example provided in FIG. 10C, are used to connect the cross-rails connecting the lower surface spar and the upper surface spar.

The disclosed embodiments are not limited to the examples represented and can, in theory, take into account each pin or material in an independent manner, which provides a large freedom of choice for solutions that can be optimised.

The invention claimed is:

1. A device for assembling sections of wind turbine blades provided with composite casings, including at least one tie comprising a first portion and a second portion, the first portion being a portion for assembly with a casing of a first section and the second portion being a portion for mounting with a complementary tie supported by a casing of a second section, wherein the first portion includes at least one composite/metal shear link provided with a continuous metallic fitting element on at least one flat side of the casing, said fitting element receiving one end of said flat side of the casing, provided with several rows and lines of attachment pins passing through the fitting and the end of the flat side, wherein the composite/metal link has at least double shear and is additionally provided with back-fitting element, the end of said flat side of the casing being received between the fitting and the back fitting element, the rows and lines of attachment pins passing through the fitting, the end of the flat side and the back fitting element, the back fitting being attached to casing and the fitting.

2. A device for assembling sections of wind turbine blades according to claim 1, wherein the composite/metal link is a multi-shear link perpendicular to the attachments and comprises into the composite material a metallic doubler adapted to carry forces between the composite portion and said metallic fitting element.

3. A wind turbine blade comprising at least two sections, each provided with a casing wherein the sections are assembled by means of a pair of assembly devices according to claim 1.

4. A wind turbine blade according to claim 3, wherein an end of said side terminates with a reinforced monolithic structure.

5. A wind turbine blade according to claim 4, wherein the reinforced monolithic structure is essentially reinforced by carbon layers.

6. A wind turbine blade according to claim 4, wherein said central casing comprises a composite structure progressively replaced by the reinforced monolithic structure at the terminal point of the section.

7. A wind turbine blade according to claim 3, wherein said composite/metal link comprises a local reinforcing element for the end of the casing surface in the form of composite plies.

8. A wind turbine blade according to claim 3, wherein the fitting element is comprised from a continuous, closed frame supporting surfaces and fins of the end of the casing.

9. A wind turbine blade according to claim 3, wherein said blade comprises two of said ties, the assembly portions of which are constituted from a plate supporting one side of an end of the casing.

10. A wind turbine blade according to claim 9, wherein said ties are positioned on an upper-flat side and a lower flat side of the casings located underneath an upper surface and a lower surface of the section of the blade.

11. A wind turbine blade according to claim 10, wherein ends of the sides of the casing, located between the upper surface and the lower surface, receive connecting squares.

12. A wind turbine blade according to claim 3, wherein the ends of the casing surfaces comprise a terminal point with a skin to skin terminal.

13. A wind turbine blade according claim 12, wherein the ends of the casing surfaces comprise a terminal point with reinforcement of the skin to skin terminal.

14. A wind turbine blade according to claim 3, wherein ends of the casing surfaces comprise a terminal point with the filling of a honeycomb and/or a densified honeycomb.

15. A wind turbine blade according to claim 3, wherein the portions for mounting the ties with the complementary ties comprise surfaces adapted for attachment by axial link using tensile bolt means.

16. A wind turbine blade according to claim 3, wherein the ties are positioned within the aerodynamic profile of the blade.

* * * * *